United States Patent
Kuznicki et al.

(10) Patent No.: US 6,486,086 B1
(45) Date of Patent: Nov. 26, 2002

(54) SIMPLIFIED METHODS OF MANUFACTURING TITANIUM SILICATE MEMBRANES

(75) Inventors: Steven M. Kuznicki, Whitehouse Station, NJ (US); Richard M. Jacubinas, Somerville, NJ (US); Tadeusz W. Langner, Maplewood, NJ (US)

(73) Assignee: Engelhard Corporation, Iselin, NJ (US)

( * ) Notice: Subject to any disclaimer, the term of this patent is extended or adjusted under 35 U.S.C. 154(b) by 53 days.

(21) Appl. No.: 09/663,829

(22) Filed: Sep. 15, 2000

(51) Int. Cl.⁷ .............................. B01J 20/28; B01J 35/02
(52) U.S. Cl. .............................. 502/4; 502/64; 502/242; 502/241; 502/263; 502/208; 502/214
(58) Field of Search .............................. 502/4, 64, 242, 502/241, 263, 208, 214

(56) References Cited

U.S. PATENT DOCUMENTS

| 4,699,892 A | * | 10/1987 | Suzuki | ........................ 502/4 |
|---|---|---|---|---|
| 4,853,202 A | | 8/1989 | Kuznicki | |
| 4,938,939 A | | 7/1990 | Kuznicki | |
| 5,019,263 A | | 5/1991 | Haag et al. | |
| 5,069,794 A | | 12/1991 | Haag et al. | |
| 5,100,596 A | | 3/1992 | Haag et al. | |
| 5,244,650 A | | 9/1993 | Kuznick et al. | |
| 5,346,535 A | | 9/1994 | Kuznicki et al. | |
| 5,989,316 A | | 11/1999 | Kuznicki et al. | |
| 6,068,682 A | | 5/2000 | Kuznicki et al. | |
| 6,190,638 B1 | * | 2/2001 | Anthonis et al. | ............ 423/702 |
| 6,340,433 B1 | * | 1/2002 | Kuznicki et al. | ...... 210/500.25 |

* cited by examiner

*Primary Examiner*—Stanley S. Silverman
*Assistant Examiner*—Christina Ildebrando
(74) *Attorney, Agent, or Firm*—Stuart D. Frenkel

(57) ABSTRACT

A simplified method of forming a porous crystalline titanium silicate membrane comprises preforming a mass of titanium dioxide particles into a consolidated preform such as by pressing into a thin film, and contacting the thin film of titanium dioxide with an aqueous alkaline silicate synthesis solution at a temperature and for a period of time sufficient to form the titanium silicate in-situ.

36 Claims, 1 Drawing Sheet

US 6,486,086 B1

SIMPLIFIED METHODS OF MANUFACTURING TITANIUM SILICATE MEMBRANES

FIELD OF THE INVENTION

This invention relates to processes for fluid separation utilizing membranes formed from crystalline titanium silicate molecular sieves. In particular, the invention is directed to novel methods of producing crystalline titanium silicate membranes.

BACKGROUND OF THE INVENTION

Since the discovery by Milton and coworkers (U.S. Pat. Nos. 2,882,243 and 2,882,244) in the late 1950's that aluminosilicate systems could be induced to form uniformly porous, internally charged crystals, analogous to molecular sieve zeolites found in nature, the properties of synthetic aluminosilicate zeolite molecular sieves have formed the basis of numerous commercially important catalytic, adsorptive and ion-exchange applications. This high degree of utility is the result of a unique combination of high surface area and uniform porosity dictated by the "framework" structure of the zeolite crystals coupled with the electrostatically charged sites induced by tetrahedrally coordinated $Al^{+3}$. Thus, a large number of "active" charged sites are readily accessible to molecules of the proper size and geometry for adsorptive or catalytic interactions. Further, since charge compensating cations are electrostatically and not covalently bound to the aluminosilicate framework, they are generally base exchangeable for other cations with different inherent properties. This offers wide latitude for modification of active sites whereby specific adsorbents and catalysts can be tailor-made for a given utility.

In the publication "Zeolite Molecular Sieves", Chapter 2, 1974, D. W. Breck hypothesized that perhaps 1,000 aluminosilicate zeolite framework structures are theoretically possible, but to date only approximately 150 have been identified. While compositional nuances have been described in publications such as U.S. Pat. Nos. 4,524,055; 4,603,040; and 4,606,899, totally new aluminosilicate framework structures are being discovered at a negligible rate.

With slow progress in the discovery of new aluminosilicate based molecular sieves, researchers have taken various approaches to replace aluminum or silicon in zeolite synthesis in the hope of generating either new zeolite-like framework structures or inducing the formation of qualitatively different active sites than are available in analogous aluminosilicate based materials.

It has been believed for a generation that phosphorus could be incorporated, to varying degrees, in a zeolite type aluminosilicate framework. In the more recent past (JAC 104, pp. 1146 (1982); proceedings of the $7_{th}$ International Zeolite Conference, pp. 103–112, 1986) E. M. Flanigan and coworkers have demonstrated the preparation of pure aluminophosphate based molecular sieves of a wide variety of structures. However, the site inducing $Al^{+3}$ is essentially neutralized by the $P^{+5}$, imparting a +1 charge to the framework. Thus, while a new class of "molecular sieves" was created, they are not zeolites in the fundamental sense since they lack "active" charged sites.

Realizing this inherent utility limiting deficiency, for the past few years the research community has emphasized the synthesis of mixed aluminosilicate-metal oxide and mixed aluminophosphate-metal oxide framework systems. While this approach to overcoming the slow progress in aluminosilicate zeolite synthesis has generated approximately 200 new compositions, all of them suffer either from the site removing effect of incorporated $p^{+5}$ or the site diluting effect of incorporating effectively neutral tetrahedral +4 metal into an aluminosilicate framework. As a result, extensive research has failed to demonstrate significant utility for any of these materials.

A series of zeolite-like "framework" silicates have been synthesized, some of which have larger uniform pores than are observed for aluminosilicate zeolites. (W. M. Meier, Proceedings of the $7^{th}$ International Zeolite Conference, pp. 13–22 (1986)). While this particular synthesis approach produces materials which, by definition, totally lack active, charged sites, back implantation after synthesis would not appear out of the question although little work appears in the open literature on this topic.

Another and most straightforward means of potentially generating new structures or qualitatively different sites than those induced by aluminum would be the direct substitution of some charge inducing species for aluminum in a zeolite-like structure. To date the most notably successful example of this approach appears to be boron in the case of ZSM-5 analogs, although iron has also been claimed in similar materials. (EPA 68,796 (1983), Taramasso, et. al.; Proceedings of the $5^{th}$ International Zeolite Conference; pp. 40–48 (1980)); J. W. Ball, et. al.; Proceedings of the $7^{th}$ International Zeolite Conference; pp. 137–144 (1986); U.S. Pat. No. 4,280,305 to Kouenhowen, et. al. Unfortunately, the low levels of incorporation of the species substituting for aluminum usually leaves doubt if the species are occluded or framework incorporated.

In 1967, Young in U.S. Pat. No. 3,329,481 reported that the synthesis of charge bearing (exchangeable) titaniumsilicates under conditions similar to aluminosilicate zeolite formation was possible if the titanium was present as a "critical reagent" +III peroxo species. While these materials were called "titanium zeolites" no evidence was presented beyond some questionable X-ray diffraction (XRD) patterns and his claim has generally been dismissed by the zeolite research community. (D. W. Breck, Zeolite Molecular Sieves, p. 322 (1974); R. M. Barrer, Hydrothermal Chemistry of Zeolites, p. 293 (1982); G. Perego, et. al., Proceedings of $7^{th}$ International Zeolite conference, p. 129 (1986)). For all but one end member of this series of materials (denoted TS materials), the presented XRD patterns indicate phases too dense to be molecular sieves. In this case of the one questionable end member (denoted TS-26), the XRD pattern might possibly be interpreted as a small pored zeolite, although without additional supporting evidence, it appears extremely questionable.

A naturally occurring alkaline titanosilicate identified as "Zorite" was discovered in trace quantities on the Siberian Tundra in 1972 (A. N. Mer'kov, et. al.; Zapiski Vses Mineralog. Obshch., pp. 54–62 (1973)). The published XRD pattern was challenged and a proposed structure reported in a later article entitled "The OD Structure of Zorite", Sandomirskii, et. al., Sov. Phys. Crystallogr. 24(6), Nov.–Dec. 1979, pp. 686–693.

No further reports on "titanium zeolites" appeared in the open literature until 1983 when trace levels of tetrahedral Ti(IV) were reported in a ZSM-5 analog. (M. Taramasso, et. al.; U.S. Pat. No. 4,410,501 (1983); G. Perego, et. al.; Proceedings of the $7^{th}$ International Zeolite Conference; p. 129 (1986)). A similar claim appeared from researchers in mid-1985 (EPA 132,550 (1985)). The research community reported mixed aluminosilicate-titanium (IV) (EPA 179,876 (1985); EPA 181,884 (1985) structures which, along with TAPO (EPA 121,232 (1985) systems, appear to have no possibility of active titanium sites. As such, their utility has been limited to catalyzing oxidation.

In U.S. Pat. No. 4,938,939, issued Jul. 3, 1990, Kuznicki disclosed a new family of synthetic, stable crystalline titanium silicate molecular sieve zeolites, which have a pore size of approximately 3–4 Angstrom units and a titania/silica mole ratio in the range of from 1.0 to 10. The entire content of U.S. Pat. No. 4,938,939 is herein incorporated by reference. Members of the family of molecular sieve zeolites designated ETS-4 in the rare earth-exchanged form have a high degree of thermal stability of at least 450° C. or higher depending on cationic form, thus rendering them effective for use in high temperature catalytic processes. ETS zeolites are highly adsorptive toward molecules up to approximately 3–5 Angstroms in critical diameter, e.g. water, ammonia, hydrogen sulfide, $SO_2$, and n-hexane and are essentially non-adsorptive toward molecules, which are larger than 5 Angstroms in critical diameter.

A large pore crystalline titanium silicate molecular sieve composition having a pore size about 8 Angstrom units has also been developed by the present assignee and is disclosed in U.S. Pat. No. 4,853,202, which patent is herein incorporated by reference. This crystalline titanium silicate molecular sieve has been designated ETS-10.

The new family of microporous titanium silicates developed by the present assignee, and generically denoted as ETS, are constructed from fundamentally different building units than classical aluminosilicate zeolites. Instead of interlocked tetrahedral metal oxide units as in classical zeolites, the ETS materials are composed of interlocked octahedral chains and classical tetrahedral rings. In general, the chains consist of six oxygen-coordinated titanium octahedra and wherein the chains are connected three dimensionally via tetrahedral silicon oxide units or bridging titanosilicate units. The inherently different crystalline titanium silicate structures of these ETS materials have been shown to produce unusual and unexpected results when compared with the performance of aluminosilicate zeolite molecular sieves. For example, the counter-balancing cations of the crystalline titanium silicates are associated with the charged titania chains and not the uncharged rings, which form the bulk of the structure. In ETS-10, this association of cations with the charged titania chains is widely recognized as resulting in the unusual thermodynamic interactions with a wide variety of sorbates, which have been found. This includes relative weak binding of polar species such as water and carbon dioxide and relatively stronger binding of larger species, such as propane and other hydrocarbons. These thermodynamic interactions form the heart of low temperature desiccation processes as well as evolving Claus gas purification schemes. The unusual sorbate interactions are derived from the titanosilicate structure, which places the counter-balancing cations away from direct contact with the sorbates in the main ETS-10 channels.

In recent years, scores of reports on the structure, adsorption and, more recently, catalytic properties of wide pore, thermally stable ETS-10 have been made on a worldwide basis. This worldwide interest has been generated by the fact that ETS-10 represents a large pore thermally stable molecular sieve constructed from what had previously been thought to be unusable atomic building blocks.

Although ETS-4 was the first molecular sieve discovered which contained the octahedrally coordinated framework atoms and as such was considered an extremely interesting curiosity of science, ETS-4 has been virtually ignored by the world research community because of its small pores and reported low thermal stability. As synthesized, ETS-4 has an approximately 4 Å effective pore diameter. Reference to pore size or "effective pore diameter" defines the effective diameter of the largest gas molecules significantly adsorbed by the crystal. This may be significantly different from, but systematically related to, the crystallographic framework pore diameter. For ETS-4, the effective pore is defined by eight-membered rings formed from $TiO_6^{2-}$ octahedra and $SiO_4$ tetrahedra. This pore is analogous to the functional pore defined by the eight-membered tetrahedral metal oxide rings in traditional small-pored zeolite molecular sieves.

The pores of ETS-4 formed by the eight-membered polyhedral $TiO_6$ and $SiO_4$ units are non-faulted in a singular direction, the b-direction, of the ETS crystal and, thus, fully penetrate the crystal, rendering the ETS-4 useful for molecular separations. Recently, however, researchers of the present assignee have discovered a new phenomenon with respect to ETS-4. In appropriate cation forms, the pores of ETS-4 can be made to systematically shrink from slightly larger than 4 Å to less than 3 Å during calcinations, while maintaining substantial sample crystallinity. These pores may be "frozen" at any intermediate size by ceasing thermal treatment at the appropriate point and returning to ambient temperature. These materials having controlled pore sizes are referred to as CTS-1 (contracted titanosilicate-1) and are described in commonly assigned U.S. Pat. No. 6,068,682, issued May 30, 2000 herein incorporated by reference in its entirety. Thus, ETS-4 may be systematically contracted under appropriate conditions to CTS-1 with a highly controllable pore size in the range of 3 –4 Å. With this extreme control, molecules in this range may be separated by size, even if the sizes of the respective molecules are nearly identical. This profound change in adsorptive behavior is accompanied by systematic structural changes as evidenced by X-ray diffraction patterns and infrared spectroscopy. The systematic contraction of ETS-4 to CTS-1 to a highly controllable pore size has been named the Molecular Gate™ effect. This effect is leading to the development of separation of molecules differing in size by as little as 0.1 Angstrom, such as $N_2/O_2$ (3.6 and 3.5 Angstroms, respectively), $CH_4/N_2$ (3.8 and 3.6 Angstroms), or $CO/H_2$ (3.6 and 2.9 Angstroms). High pressure $N_2/CH_4$ separation systems are now being developed.

Separations of fluid mixtures (gases or liquids) by adsorption utilizing the ETS-type molecular sieves have been proposed in which the molecular sieve is utilized in the form of a bed, typically fixed, through which the mixture to be separated flows. Both pressure swing adsorption (PSA) and thermal swing adsorption (TSA) have been suggested to effect separation of one or more fluids from mixtures containing same. Presently suggested separations using ETS molecular sieve adsorbents include the use of ETS-10 to adsorb hydrocarbon species from a Claus feed gas also containing hydrogen sulfide and other polar gases. In such process, the ETS-10 adsorbent is regenerated by a temperature swing (TSA) causing desorption of the hydrocarbons. Also proposed by the present assignee is the use of ETS-4 and contracted versions thereof, CTS-1, in a high pressure separation of nitrogen from natural gas. In this latter system, pressure swing adsorption (PSA) is utilized to adsorb the nitrogen from the natural gas stream, and desorb the nitrogen from the titanium silicate molecular sieve.

The unique property of ETS-10 to only weakly bind polar species so as to cause polar species to pass through the adsorbent at mildly elevated temperatures, and the ability to actually control and systematically shrink the pore size of ETS-4 to its CTS version have played significantly in allowing high capacity, fixed bed separation systems to be developed utilizing these titanium silicate molecular sieves. One disadvantage, however, of the PSA and TSA systems is that the adsorbent beds quickly reach the sorbent capacities thereof resulting in a "breakthrough" of the sorbate into the product stream. An additional disadvantage of these processes is that at elevated temperatures, the adsorbent bed loses its capacity to hold the sorbate, resulting in the contamination of the product stream as the non-adsorbed sorbate passes through the spaces between the individual particles of the molecular sieve and breaks through into the product. Heating, however, is often advantageous to improve the kinetics of the adsorption process. Accordingly, adsorption undertaken in the presence of a bed of molecular sieve operates under multiple timed cycles of adsorption and desorption to prevent over-reaching the capacity of the adsorbent and consequent breakthrough of the sorbate into the product during adsorption, and contamination of the sorbate by product fronts during desorption. On a daily basis, many of such adsorption/desorption cycles must be run. Typically, multiple beds of molecular sieve are used, operating in parallel, some of which are undergoing adsorption while others undergo desorption or intermediate pressurizations and depressurizations if a PSA system is utilized. The need for multiple cycles and/or multiple beds obviously requires a high capital investment for production of a significant volume of product such as on a commercial scale. Moreover, such systems have high maintenance costs.

The use of membranes to provide fluid separation of mixtures is a known alternative to the use of beds of molecular sieves and use thereof in PSA or TSA processes. The membrane separation process is rather straight forward and does not require the timed cycles of adsorption and desorption needed with fixed bed molecular sieve technology. In membrane applications, small molecules (permeate) are not adsorbed but simply pass across the plane of the membrane through distinctly sized pores. The larger sized molecules (retentate) cannot pass through the pores and are retained upstream of the membrane plane. Accordingly, there is no adsorbent over-capacity problem and consequent breakthrough of retentate into product, and, thus, no need for timed cycles. There are, however, disadvantages to membrane technology. For one, while advances in polymer membranes have been made, these materials are still subject to chemical destabilization and are not universally inert to all fluid mixtures. Even water present can degrade many such membranes. Zeolite crystalline aluminosilicates with a narrow distribution of pore sizes on a molecular scale have high thermal, chemical, and mechanical stabilities. Molecular sieves can be, for example, alumina phosphates (ALPO) or silicoaluminophosphates (SAPO), which are also microporous, crystalline materials with a narrow distribution of pore sizes and also have high thermal, chemical, and mechanical stabilities. Therefore, zeolites and molecular sieves can be used in bed form not only for fluid separations in adsorption/desorption processes, as mentioned above, but also as diffusion membranes when prepared in thin film form. The size and adsorption properties of the zeolite pores, however, limit what can be separated with a particular type of zeolite membrane, even if the crystalline structure is perfect and defect free. Zeolite membranes are further problematic with respect to polar species, which are strongly held within the charged structure of the zeolite pores. Thus, fluid mixtures containing water, $CO_2$, etc. can adversely affect membrane productivity. The simplification and, thus, lower capital and operational costs of separations utilizing membranes, however, wherein the permeate and retentate are continuously separated is a large factor in the continued development of membrane separations.

SUMMARY OF THE INVENTION

In accordance with this invention, separation of components from gaseous or liquid mixtures containing same is provided by contacting the mixtures with membranes formed from titanium silicate molecular sieves, including the ETS molecular sieves developed by Engelhard Corporation. The ETS sieves are distinguished from other molecular sieves by possessing octahedrally coordinated titania active sites in the crystalline structure. These molecular sieves contain electrostatically charged units that are radically different from charged units in conventionally tetrahedrally coordinated molecular sieves such as in the classic aluminosilicate zeolites. Members of the ETS family of sieves include, by way of example, ETS-4 (U.S. Pat. No. 4,938,939), ETS-10 (U.S. Pat. No. 4,853,202), and ETAS-10 (U.S. Pat. No. 5,244,650), all of which are titanium silicates or titanium aluminum silicates. The disclosures of each of the listed patents are incorporated herein by reference.

Membranes formed from ETS-4 molecular sieve are particularly useful inasmuch as the pores of the ETS-4 membranes can be systematically contracted under thermal dehydration to form CTS-1-type materials as disclosed in U.S. Pat. No. 6,068,682. Under thermal dehydration, the pore size of ETS-4 can be systematically controlled from about 4 Å to 2.5 Å and sizes therebetween and frozen at the particular pore size by ending the thermal treatment and returning the molecular sieve to ambient temperature. The ability to actually control the pore size of a particular molecular sieve greatly increases the number of separations achievable by a single molecular sieve unlike previous zeolite membranes in which the adsorption and diffusion properties of the zeolite pores limit what can be separated with a particular type of zeolite membrane. It has recently been discovered that certain polymorphs of ETS-4 can be prepared which not only contain the open small pores along the b-axis of the crystallographic lattice, which characterize ETS-4, but which further contain larger pores which are open and interpenetrate the lattice in the c-direction. Controlled shrinkage of these larger pores further increases the number of molecules which an be separated by this polymorph-enriched ETS-4. This material has been called ETS-6 and is the subject of co-pending application U.S. Serial No. (Docket No. 4701).

The titanium silicate membranes of this invention can be prepared by a novel method which simplifies prior art crystallization processes and can yield membranes of varying shapes and sizes.

DETAILED DESCRIPTION OF THE INVENTION

Figure 1:
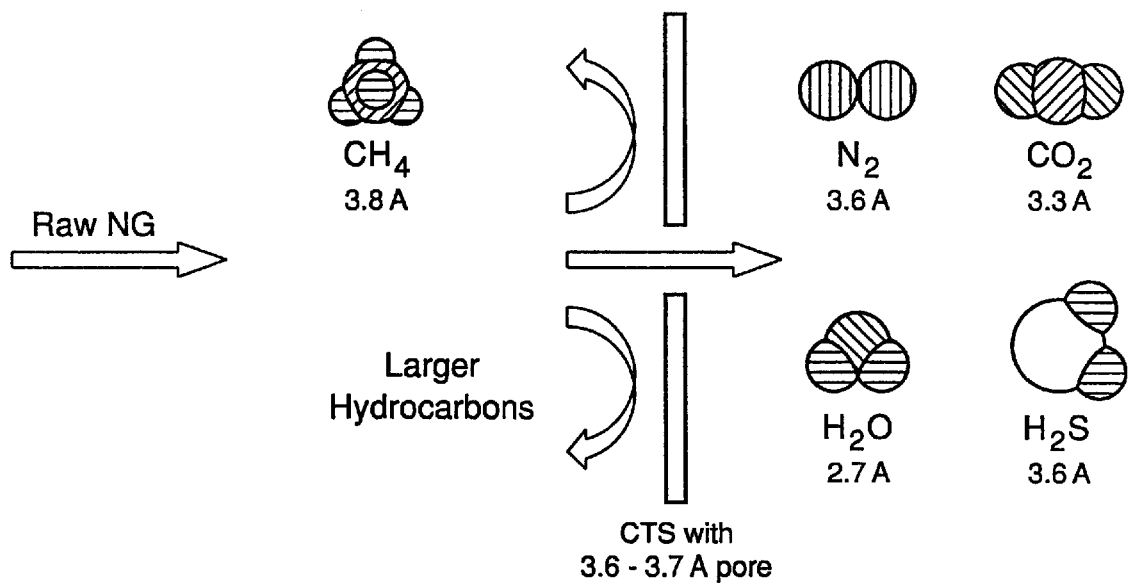
FIG. 1 is a depiction of a process using titanium silicate membranes for separating nitrogen from natural gas.

It is preferred to use as the titanium silicate material which is formed into membranes of this invention, ETS-4, and more preferably, contracted versions of ETS-4, known as CTS-1. ETS-4 titanium silicates have a definite X-ray diffraction pattern unlike other molecular sieve zeolites and can be identified in terms of mole ratios of oxides as follows:

$$1.0 \pm 0.25\ M_{2/n}O:TiO_2:ySiO_2:zH_2O$$

wherein M is at least one cation having a valence of n, y is from 1.0 to 10.0, and z is from 0 to 100. In a preferred embodiment, M is a mixture of alkali metal cations, particularly sodium and potassium, and y is at least 2.5 and ranges up to about 5. The original cations M can be replaced at least in part with other cations by well-known exchange techniques. Preferred replacing cations include hydrogen, ammonium, alkaline earth, rare earth, and mixtures thereof.

Members of the ETS-4 molecular sieve zeolites have an ordered crystalline structure and an X-ray powder diffraction pattern having the following significant lines:

TABLE 1

XRD POWDER PATTERN OF ETS-4
(0–40° 2 theta)

| SIGNIFICANT d-SPACING (ANGS.) | I/I$_0$ |
|---|---|
| 11.65 ± 0.25 | S–VS |
| 6.95 ± 0.25 | S–VS |
| 5.28 ± 0.15 | M–S |
| 4.45 ± 0.15 | W–M |
| 2.98 ± 0.05 | VS |

In the above table,
VS = 50–100
S = 30–70
M = 15–50
W = 5–30

The above values were collected using standard techniques on a Phillips APD3720 diffractometer equipped with a theta compensator as described by aforementioned U.S. Pat. No. 4,938,939, incorporated by reference.

As disclosed in commonly assigned U.S. Pat. No. 6,086,682, it has been discovered that ETS-4 can be transformed into CTS-1 by the heating of ETS-4, preferably in the strontium or calcium form with or without low levels of sodium, at temperatures ranging from about 50° C. to 450° C., or preferably 200° C. to 350° C. for strontium and/or calcium mixed with sodium for 0.5 to 100 or more hours, preferably 24–48 hours, then cooling the thus treated material in order to lock in the desired pore size. The manner of cooling is not critical and it can be accomplished in air, vacuum or inert gas either slowly or rapidly. The calcination temperature used to achieve a desired pore diameter depends on the cations present in the reagent ETS-4. Although multivalent strontium and calcium are the preferred cations for CTS-1 for natural gas separations, other cations can be used with appropriate changes of temperature and duration of thermal treatment. Various combinations of Sr, Ca, Li, Mg, Na, H, Ba, Y, La, and/or Zn have all demonstrated N$_2$/CH$_4$ selectivities.

Although the novel materials of this invention have been prepared from the calcium and strontium form of ETS-4, there is no theoretical reason why other cations could not be used with appropriate changes of temperature and duration of thermal treatment. Additionally, the CTS-1 materials can be back-exchanged with metal, ammonium or hydrogen ions in a conventional manner if such is desired.

The crystalline titanium molecular sieves hereafter referred to as CTS-1, have a pore size of about 3–4 Å and have a composition in terms of mole ratio of oxides as follows:

$$1.0 \pm 0.25\ M_{2/n}O:TiO_2:ySiO_2:zH_2O$$

where M is at least 1 cation having a valence n, y is 1–10 and z is from 0–10 and more preferably 0–5, and characterized by an X-ray powder diffraction pattern having the lines and relative intensity set forth in Table 2 below.

TABLE 2

XRD POWDER PATTERN OF CTS-1
(0–40° 2 theta)

| SIGNIFICANT d-SPACING (ANGS.) | I/I$_0$ |
|---|---|
| 11.4 ± 0.25 | Very Strong |
| 6.6 ± 0.2 | Medium–Strong |
| 4.3 ± 0.15 | Medium–Strong |
| 3.3 ± 0.07 | Medium–Strong |
| 2.85 ± 0.07 | Medium–Strong | wherein very strong equals 100, medium-strong equals 15–80.

A particularly useful titanium silicate is ETS-4 which is enriched with one or two polymorphs having small pores interpenetrating the crystallographic b-axis of ETS-4 and layer pores (6 Å) interpenetrating the crystallographic c-axis. This material has been given the name ETS-6 and has a composition in terms of mole ratios of oxides as follows:

$$1.0 \pm 0.25\ M_{2/n}O:TiO_2:ySiO_2:zH_2O$$

wherein M is at least one cation having a valence of n, y is from 1.0 to 100, and z is from 0 to 100 and characterized by an X-ray powder diffraction pattern having the lines and relative intensities set forth in Table 3 below:

TABLE 3

XRD POWDER PATTERN OF ETS-6
(0–40° 2 theta)

| SIGNIFICANT d-SPACING (ANGS.) | I/I$_0$ |
|---|---|
| 12.50 ± 0.25 | W–M |
| 11.65 ± 0.25 | S–VS |
| 6.95 ± 0.25 | S–VS | where,
VS = 50–100
S = 30–70
M = 15–50
W = 5–30

ETS-6 is disclosed in U.S. Serial No. 09/640,313, the entire contents of which are herein incorporated by reference. Other titanium silicates can be formed into membranes and used in fluid (gas and liquid) separation in accordance with this invention, including ETS-10 and ETAS-10.

The titanium silicate molecular sieves can be produced as membranes by any technique known in the art, including methods known in the art for production of zeolite membranes. The membranes can be unsupported or supported on a porous metal or ceramic and the like. For example, the titanium silicate membranes can be formed from hydrothermal synthesis using aqueous solutions of the titanium silicate precursors spread against a substrate surface to form the membrane layer. Likewise, gels of the titanium silicate precursors can be spread across a surface and the gel precursors again heat treated to form the appropriate titanium silicate molecular sieve. Growth from solid precursors, such as shaped TiO$_2$ can be performed. Other methods include chemical vapor deposition which is also known in the art. Reference is made to U.S. Pat. No. 6,051,517 which sets forth numerous articles describing the preparation of zeolite membranes as well as U.S. Pat. Nos. 5,110,478;

5,100,596; 5,069,794; 5,019,263; 4,578,372; 4,699,892, all of which describe zeolite membrane preparation and are incorporated herein by reference. For separation processes using this invention, the particular membrane-forming method is not believed to be critical. Any method can be used so long as the membranes are relatively free of defects to prevent passage of retentate across the membrane.

The present invention is also directed to a novel method of forming the titanium silicate membranes. Thus, it is preferred to form the titanium silicate membranes in-situ directly from $TiO_2$ or mixtures of $TiO_2$ with other species such as $SiO_2$. In this particular process, the solid titanium dioxide is simply immersed in or otherwise continuously contacted with an aqueous solution containing the other synthesis components including sodium silicate, sodium hydroxide and water and the mixture reacted at elevated temperatures sufficient for synthesis of the desired molecular sieve. A portion of the silicate reactant can also be included in solid form. It may also be useful to include seeds of the crystalline titanium silicate molecular sieve, which is to be formed into a membrane in the solid mix or added as a slurry to the liquid synthesis solution containing the other components.

This novel membrane-forming method is particularly useful inasmuch as the solid components such as the titanium dioxide, and any other optional solids such as silica or any seed titanium silicate crystals, can be pre-formed into any desired shape such as being pressed under heavy pressure and into consolidated thin films. Once the solid is formed into the desired shape, such as a desired thin film, the shaped titanium dioxide solid and optional solid components can be immersed in an aqueous solution containing the other components present in the correct amounts for the synthesis of the desired molecular sieve. Subsequent heating, typically at an elevated temperature such as between 150° and 350° C., preferably between 200° and 225° C. for 8 to 24 hours results in the in-situ formation of the desired crystalline titanium silicate molecular sieve in the form of the pressed preform such as a thin film membrane. When performing a seeded synthesis in which the solid titanium dioxide preform also includes a portion of the crystalline titanium silicate molecular sieve which is desired to be formed, anywhere from 1 to 40% by weight of the preformed consolidated solids can be the crystalline titanium silicate seed. Preferably, from about 5 to up to about 25 wt. % of the solid preform is the titanium silicate seed crystals. The crystalline titanium silicate molecular sieves, including ETS-4, have a density which is much lower than the titanium dioxide. Accordingly, the titanium silicate crystals grow outward to fill gaps in the growing membrane. Fissures and other imperfections in the membrane can thereby be greatly minimized. While it is preferred to preform the titanium dioxide into thin films such as for use in membrane film separation, any size or shape membrane can be generated by preforming the precursor solid mix including titanium dioxide and optional solids such as silica and titanium silicate seed crystal.

While this invention is directed to forming titanium silicate membranes, it is believed the simplified method of forming the membrane from pressed metal oxide would be useful for any type of porous crystalline metallosilicate including aluminosilicate, aluminosilicate zeolite, and such silicates where a portion or all of the aluminum is replaced with, for example, gallium, titanium, zirconium, manganese, etc. Thus, the metal oxide is pressed as a solid into the desired consolidated shape such as a thin film, and the preform continuously contacted with or submerged in the remaining silicate synthesis solution at the needed concentrations known in the art for producing the desired silicate. Subsequent heating at the proper temperature results in the desired metallosilicate in the shape of the pressed preform. Alumino phosphate membranes can also be formed, typically using a phosphate synthesis solution which is acidic as is well known in the art.

The titanium silicate molecular sieve membranes of the present invention can be utilized in any process known to separate one molecule from another whether in the liquid or gaseous state. In the preferred embodiments of this invention, ETS-4 and its contracted versions, CTS-1, are used in the form of membranes to separate gaseous molecules which have a size difference of 0.1 Å or more. This is possible since the pore size of the CTS-1 material can be precisely controlled by shrinking the pores of ETS-4 upon thermal treatment. The pores of the CTS-1 material can be frozen in place at a particular size by stopping the thermal treatment and cooling to ambient temperature.

One particular preferred use of the titanium silicate molecular sieve membranes, and, in particular, the CTS-1 membranes, is the separation of small polar species such as $CO_2$, $H_2O$, $N_2$ and $H_2S$ from hydrocarbons such as raw natural gas at mildly elevated temperature and full natural gas pressure. In 1993, the Gas Research Institute (GRI) estimated that 10–15% (about 22 trillion cubic feet) of the natural gas reserves in the U.S. are defined as sub-quality due to the contamination with nitrogen, carbon dioxide, and sulfur. Nitrogen and carbon dioxide are inert gases with no BTU value and must be removed to low levels, i.e. less than 4%, before the gas can be sold. The purification of natural gas usually takes place in two stages in which the polar gases such as $CO_2$, $H_2S$ and water are removed prior to nitrogen removal. Generally, $CO_2$, $H_2S$, and $H_2O$ removal are currently performed using three separate systems including acid gas scrubbers for removal of $H_2S$ and $CO_2$, glycol dehydration, and molecular sieve dehydration. At present, nitrogen removal is typically limited to cryogenics. A cryogenic process is expensive to install and operate, limiting its application to a small segment of reserves. For example, a nitrogen content of higher than 15% is needed to render the process economical. While proposed pressure swing adsorption processes utilizing titanium silicate molecular sieves are being developed by the present assignee, such processes up to this time have also relied on removal of polar gases prior to contacting the nitrogen-containing natural gas with the adsorbent. Further, as previously described, these PSA systems are costly to build and to operate.

It is believed possible that with the titanium silicate membranes of this invention, in particular, with the use of CTS-1 membranes, natural gas purification can be substantially accomplished in one step. This one step process is depicted in FIG. 1. As shown therein, a raw natural gas stream is directed to a CTS-1 membrane which has been formed from thermally treated ETS-4 or an ETS-4 membrane with appropriate cation so as to have a pore size in the range of from 3.6–3.7 Å. The raw natural gas stream, methane, contains impurities in the form of polar species such as carbon dioxide, hydrogen sulfide, water, and other impurities such as nitrogen and higher hydrocarbons such as $C_2$–$C_7$ alkanes. Methane, which has a size of 3.8 Å and the higher hydrocarbons cannot pass through the pores of the CTS membrane and form the retentate product. The polar species, smaller than methane, have a size of at most 3.6 Å and are able to pass through the pores and across the plane of the membrane as permeate product. It is preferred to heat the gas at temperatures of about 50–125° C., as it has been found that at these mildly elevated temperatures, the polar species more readily pass through the pores of the titanium silicate membrane. As can be seen in FIG. 1, the use of the titanium silicate membrane purifies natural gas (methane) in one step, wherein the polar species and other low heat value materials ($N_2$) can be made to pass through the membrane by controlling the pore size thereof and removed as permeate by methods known in the art of membrane technology. The product natural gas stream can be collected as retentate and removed from the upstream side of the membrane, again, by methods known in the membrane technology.

Another important use of the titanium silicate membranes of this invention is in the formation of enriched oxygen streams with an oxygen purity of at least 30%. Such oxygen enriched streams could be used in a variety of applications including, for example., providing economical, transportable medical oxygen for those with respiratory difficulty, as well as in various combustion applications including diesel engines, enabling a cleaner, more economical combustion process. Enriched oxygen could also lead to more efficient production of pure oxygen and nitrogen by pre-enriching the air streams that enter conventional cryogenic oxygen plants. Dramatic increases in combustion engine performance are possible given the cost effective approach to oxygen enrichment. Expansion of on-site oxygen applications, such as enhanced engine/furnace combustion, will require a dramatic change in air separation technology. Thermodynamically driven $N_2$ selective adsorbents have not proven fast enough for such applications.

Current technology for providing enriched oxygen streams includes cryogenics, PSA, vacuum swing adsorption, VSA and VPSA technology as well as nitrogen membranes. Cryogenic distillation produces very pure (99.999% pure) oxygen (in either liquid or gaseous form) that is then back diluted with air. The high capital and operating cost of cryogenics makes this applicable only in high purity, high pressure or high volume (greater than 150 tons per day) uses. Current VSA technology, using carbon molecular sieves, can produce enriched oxygen at costs approaching $25/ton but rate of oxygen generation and robustness of the adsorbent limit its applications.

Nitrogen membranes can also be used to produce enriched oxygen streams with oxygen purities of 40%, however, these units suffer from flux limitations as well as contamination issues that restrict their use to lower volume applications. Membranes must also be kept free of moisture which requires some pre-drying or heating of the air prior to entering the membrane systems. The titanium silicate molecular sieve membranes of this invention have great potential value in providing a simplified method of forming enriched oxygen streams.

Figure 2:
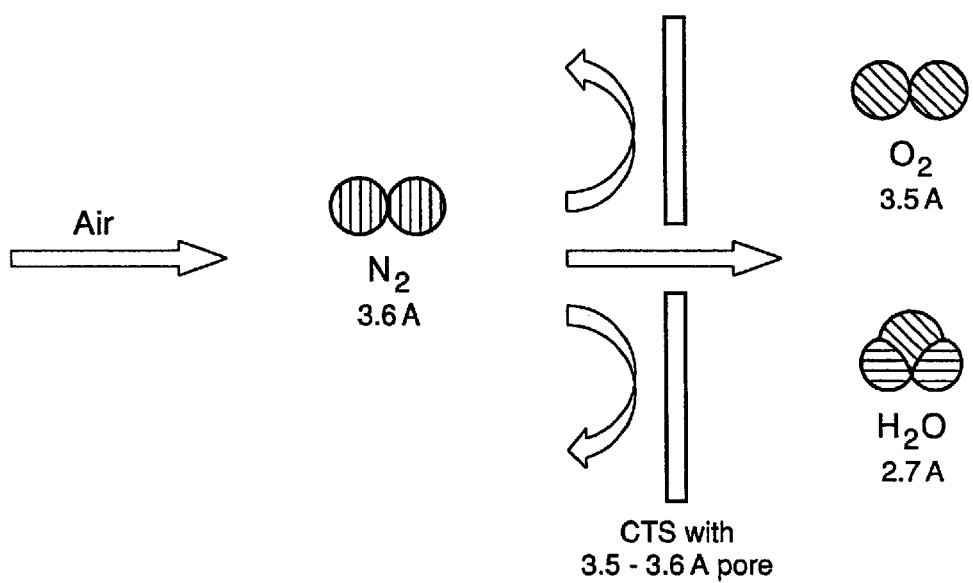
FIG. 2 is a depiction of a separation process using titanium silicate membranes for enriching air with oxygen.

Air separation utilizing the CTS titanium silicate membranes of this invention is shown in FIG. 2. It is important to note that since polar molecules such as water bind much more weakly on the titanosilicate molecular sieves than classical zeolites, these polar species are relatively mobile at mildly elevated temperatures of 50–125° C.

Accordingly, raw, humid air can be treated with the titanium silicate membranes such as of the CTS type. Thus oxygen and water readily penetrate a CTS pore of approximately 3.5–3.6 Å as permeate while the passage of the larger $N_2$ species is prevented by size exclusion. The membrane separation process of this invention is a one-step separation of air without pre-drying as is the case with many polymeric membranes which can be degraded by moisture. Referring to FIG. 2, it can be seen that raw air can be divided between its larger nitrogen component having a size of 3.6 Å as retentate from the smaller oxygen at 3.5 Å and polar water 30 at 2.7 Å which are separated as permeate product. The CTS membrane is formed from ETS-4 by thermal treatment to provide a pore size of 3.5–3.6 Å.

The titanium silicate membranes of this invention can be used in many other separation processes. The membranes can be used in the removal of argon from oxygen, sulfur dioxide removal from refinery gas or wet gas streams including raw stack gas or natural gas stream. Additionally, the precisely tailorable pore size of the CTS membrane would appear to be useful for separation of small hydrocarbons. Further separations include, in general, separation of mixtures including one or more molecular species having a diameter of 3 or more Angstroms from one or more molecular species having diameters of less than 3 Angstroms. Separation of water from air ($O_2$ and/or $N_2$), hydrogen from carbon monoxide and/or carbon dioxide, ammonia from hydrogen sulfide, etc. are a few non-limiting examples.

While the titanium silicate membranes of this invention are preferably used for gas separations, the use thereof in liquid separations is also part of this invention. For example, the membranes are useful in ethanol/water separations and for removing organic and metallic contaminants from aqueous streams produced from industrial processing or present as geographical waterways.

EXAMPLE 1

A titanium silicate membrane formed of ETS-4 was formed in the following manner. 0.29 grams of $TiO_2$ was pressed into a disk with a diameter of 13 mm and a thickness of 1 mm under 6 tons of pressure. The $TiO_2$ is P25 (Degussa) and contains 76 wt. % anatase and 24 wt. % rutile.

A synthesis liquid was made from:

3.83 grams N-brand sodium silicate 0.60 grams 50% NaOH solution 3.04 grams deionized water The solution of synthesis liquid was mixed well and placed in a Teflon autoclave liner (capacity about 15 ml.). The titanium dioxide disk was submerged in the solution and the autoclave sealed. The titanium dioxide disk was submerged in the solution for sixteen hours under autogenous pressure at an oven temperature of 225° C. After removal of the disk from the solution, the disk was washed with hot water and dried at 100° C. XRD of the disk showed that it was formed of ETS-4.

EXAMPLE 2

An existing permeation/diffusion system was modified to handle gas mixture flows on both sides of a membrane; maximum of 3 gases on inlet side and 2 gases on outlet side. The pressure on each side was individually adjustable in the range 1 to 2 atm. Absolute. The diffusion cell was designed to isolate the system from the surroundings with a single metal seal, and to hold the membrane and seal by a spring load mechanism to prevent thermal stress cracking.

A membrane similar to the one prepared in Example 1 was prepared by growing ETS-4 on a pressed $TiO_2$ particle disk. The membrane that was tested was BaETS-4 grown with SrO additive. The membrane was activated for 4 hrs. at 200° C. with abundant helium flow on both sides under moderate vacuum (2–4 torr.). The temperature increase/decrease was limited to 2° C./min.

The separations were performed at ambient temperature. The inlet side was exposed to various compositions of oxygen and methane mixtures. Helium flow was used to sweep the outlet side to a GC sampling valve. The GC was calibrated for partial pressures of the active species (oxygen or methane). During the experiment, GC analysis was converted to diffusion/permeation rate with the sweep helium flow rate.

The outlet pressure was always slightly (20 mbar) higher than the inlet pressure to measure true micropore selectivity of the membrane. Effectively, the results correspond to diffusion-permeation in micropores driven by concentration difference against a pressure gradient, which is not a normal membrane mode. The results directly correspond to micropore permeation selectivity since the only mechanism involved in transporting the active components to the outlet side is adsorption, all other mechanisms are excluded due to the negative pressure gradient. Several inlet pressures were used, 1100, 1200, 1500 and 1700 mbar. In all cases, the membrane was selective for oxygen with permeate selectivities ranging from 1.5 to 3.6. Permeate selectivity is defined as the ratio of the partial pressures in the permeate gas divided by the ratio of the partial pressures in the feed gas. In this Example $$\propto O2/CH4 = \frac{X_{O2}/X_{CH4}}{Y_{O2}/Y_{CH4}}$$

wherein X and Y are the molar fractions of the gases (partial pressure) in the permeate and feed streams, respectively.

Once given the above disclosure, many other features, modifications, and improvements will become apparent to the skilled artisan. Such other features, modifications, and improvements are, therefore, considered to be a part of this invention, the scope of which is to be determined by the following claims.

We claim:

1. A method of manufacturing a membrane of a porous, crystalline titanium silicate comprising: preforming particles of titanium dioxide into a desired consolidated shape, contacting said consolidated shape of titanium dioxide with an aqueous alkaline synthesis solution of silicate, under conditions of temperature and time sufficient to grow titanium silicate crystals in-situ from the consolidated shape of titanium dioxide in the form of a crystalline titanium silicate membrane.

2. The method of claim 1, wherein said porous crystalline titanium silicate is selected from the group consisting of ETS-4, CTS-1, ETS-6, ETS-10 and ETAS-10.

3. The method of claim 2, wherein said porous crystalline titanium silicate is ETS-4.

4. The method of claim 1, wherein said particles of titanium dioxide are formed into a consolidated flat, thin film.

5. The method of claim 4, wherein said flat thin film is formed by compressing a mass of titanium dioxide particles under sufficient pressure to form said film.

6. The method of claim 4, wherein said film has a thickness of at most about 1 mm.

7. The method of claim 5, wherein said film has a thickness of less than 1 mm.

8. The method of claim 1, wherein said particles of titanium dioxide are mixed with particulate seed crystals of said porous, crystalline titanium silicate.

9. The method of claim 8, wherein the mixture of titanium dioxide particles and titanium silicate seed crystals comprises 1 to 50 wt. % of said seed crystals.

10. The method of claim 9, wherein said mixture of titanium dioxide particles and titanium silicate seed crystals comprise up to about 25 wt. % of said seed crystals.

11. The method of claim 1, wherein said particles of titanium dioxide further include particles of silica.

12. The method of claim 11, wherein the mixture of titanium dioxide and silica comprises up to about 25 wt. % silica.

13. The method of claim 1, wherein said particles of titanium dioxide comprise a mixture of rutile and anatase forms of titanium dioxide.

14. The method of claim 13, wherein said titanium dioxide particles comprise about 76 wt. % anatase and about 24 wt. % rutile.

15. The method of claim 1, wherein said aqueous alkaline synthesis solution comprises water, alkali metal hydroxide and alkali metal silicate.

16. The method of claim 15, wherein said alkali metal hydroxide comprises sodium hydroxide and said alkali metal silicate comprises sodium silicate.

17. A method of forming a membrane of a porous, crystalline metalloate comprising: preforming a mass of particulate metal oxide into a consolidated preform, forming an aqueous synthesis solution of either an alkaline silicate or acidic phosphate for reaction with said metal oxide to produce said metalloate and contacting said consolidated preform of metal oxide with said synthesis solution for a time and temperature sufficient to form said metalloate in-situ from said consolidated preform of metal oxide in the form of a crystalline metalloate membrane.

18. The method of claim 17, wherein said metal oxide comprises oxides of aluminum, titanium, zirconium or manganese.

19. The method of claim 17, wherein said mass of particulate oxide further includes seed crystals of said metalloate crystals.

20. The method of claim 17, wherein said metalloate is a metallosilicate.

21. The method of claim 20, wherein said aqueous synthesis solution comprises an alkaline silicate.

22. The method of claim 21, wherein said aqueous synthesis solution comprises an alkali metal hydroxide and an alkali metal silicate.

23. The method of claim 20, wherein said mass of particulate metal oxide includes silica.

24. The method of claim 17, wherein said metalloate is metallophosphate.

25. The method of claim 24, wherein said aqueous synthesis solution comprises an acidic phosphate solution.

26. The method of claim 24, wherein said metallophosphate comprises aluminophosphate.

27. A method of forming a membrane of a porous, crystalline metalloate comprising: pressing a mass of particulate metal oxide into a consolidated film, forming an aqueous synthesis solution for reaction with said metal oxide to produce said metalloate and contacting said consolidated film of metal oxide with said synthesis solution for a time and temperature sufficient to form metalloate crystals in-situ from said consolidated film of metal oxide in the form of a crystalline metalloate membrane.

28. The method of claim 27, wherein said metal oxide comprises oxides of aluminum, titanium, zirconium or manganese.

29. The method of claim 27, wherein said mass of particulate metal oxide further includes seed crystals of said metalloate crystals.

30. The method of claim 27, wherein said metalloate is a metallosilicate.

31. The method of claim 30, wherein said aqueous synthesis solution comprises an alkaline silicate.

32. The method of claim 31, wherein said aqueous synthesis solution comprises an alkali metal hydroxide and an alkali metal silicate.

33. The method of claim 30, wherein said mass of particulate metal oxide includes silica.

34. The method of claim 27, wherein said metalloate is metallophosphate.

35. The method of claim 34, wherein said aqueous synthesis solution comprises an acidic phosphate solution.

36. The method of claim 34, wherein said metallophosphate comprises aluminophosphate.

* * * * *